United States Patent [19]
Hershbarger

[11] Patent Number: 5,602,912
[45] Date of Patent: Feb. 11, 1997

[54] TELEPHONE HYBRID CIRCUIT

[75] Inventor: Russell A. Hershbarger, Nevada City, Calif.

[73] Assignee: Silicon Systems, Inc., Tustin, Calif.

[21] Appl. No.: 591,209

[22] Filed: Jan. 17, 1996

Related U.S. Application Data

[63] Continuation of Ser. No. 245,211, May 16, 1994, abandoned.

[51] Int. Cl.$^6$ .................................................. H04M 9/00
[52] U.S. Cl. ........................ 379/402; 379/405; 379/399; 379/345
[58] Field of Search ................................... 379/338, 344, 379/345, 391, 394, 399, 402, 403, 404, 405, 406

[56] References Cited

U.S. PATENT DOCUMENTS

| | | | |
|---|---|---|---|
| 3,855,430 | 12/1974 | Colardelle et al. | 379/405 |
| 4,034,166 | 7/1977 | Hollis | 379/405 |
| 4,192,978 | 3/1980 | Vincent | 379/405 |
| 4,284,859 | 8/1981 | Araseki | 379/405 |
| 4,433,215 | 2/1984 | Wortman | 379/405 X |
| 4,485,277 | 11/1984 | Minch et al. | 379/345 |
| 4,500,755 | 2/1985 | Murto | 379/402 |
| 4,600,811 | 7/1986 | Hayashi et al. | 379/345 |
| 4,914,693 | 4/1990 | Beck et al. | 379/413 |
| 4,961,219 | 10/1990 | Patel | 379/398 |
| 5,068,621 | 11/1991 | Hayward et al. | 330/253 |
| 5,202,919 | 4/1993 | Kiko | 379/399 |
| 5,479,504 | 12/1995 | Nakano et al. | 379/402 |

FOREIGN PATENT DOCUMENTS 60-032496 2/1985 Japan .................................... 379/405

OTHER PUBLICATIONS

"Electronic Hybrid Telephone Line Pack" IBM Technical Disclosure Bulletin, vol. 16, No. 4, Sep. 1973 pp. 1173–1174.

Primary Examiner—Krista M. Zele
Assistant Examiner—Scott L. Weaver
Attorney, Agent, or Firm—Hecker & Harriman

[57] ABSTRACT

A method and apparatus for providing a telephone hybrid function is provided. The present invention maximizes dynamic range while providing a receive signal without interference from a transmit signal. The present invention also provides single-ended to differential conversion. The present invention may be practiced with an integrated circuit powered by a telephone line and coupled to the telephone line without the need for a high voltage isolation barrier between the integrated circuit and the telephone line.

8 Claims, 8 Drawing Sheets

TELEPHONE HYBRID CIRCUIT

This is a continuation of application Ser. No. 08/245,211 filed on May 16, 1994, abandoned.

BACKGROUND OF THE INVENTION

1. Field of the Invention

The present invention relates to telephone hybrid circuits and circuits for separating a receive audio signal from a transmit audio signal.

2. Background Art

Traditionally, telephone subscriber lines have been twisted pair wires. The two conductors of the twisted pair are referred to as tip and ring. Communication in both directions is provided by such lines. Since a person speaking into a telephone handset expects to hear his or her own voice in the earpiece, a telephone instrument introduces the transmitted signal into the receive circuit so that the transmitted signal will be heard along with the received signal in the earpiece. The transmitted signal heard at the earpiece is referred to as sidetone. Since sidetone is provided, it is generally unnecessary to completely separate the receive signal and the transmit signal, which are both present on the two conductor telephone line, from each other.

Unlike voice telephone instruments, data modems generally do not provide sidetone. Since the presence of the transmitted signal in the receive circuits would tend to interfere with the reception of the received signal, data modems usually provide circuits to separate the received signal from the transmitted signal. Such circuits are referred to as hybrid circuits. Hybrid circuits may be used to combine transmitted and received signals into a single communication path or to separate a single communication path into separate transmitted and received signals.

Hybrid circuits are also often used in both voice and data telephony for coupling a two conductor telephone line, which provides bidirectional communication, to two unidirectional trunk lines, one of which carries the transmitted signal, the other of which carries the received signal. Such coupling is referred to as two-wire-to-four-wire conversion (or four-wire-to-two-wire conversion), although it is not limited to two wire and four wire circuits, but may be used with other communication media, such as fiber optics, microwave and radio frequency (RF) media, and other types of media.

Early hybrid circuits relied on specially wound transformers to separate or combine the transmit and receive signals. The windings were phased so as to couple the desired signals in phase, but to couple the undesired signals out of phase. Thus, the desired signals are passed, but the undesired signals are cancelled.

Figure 1:
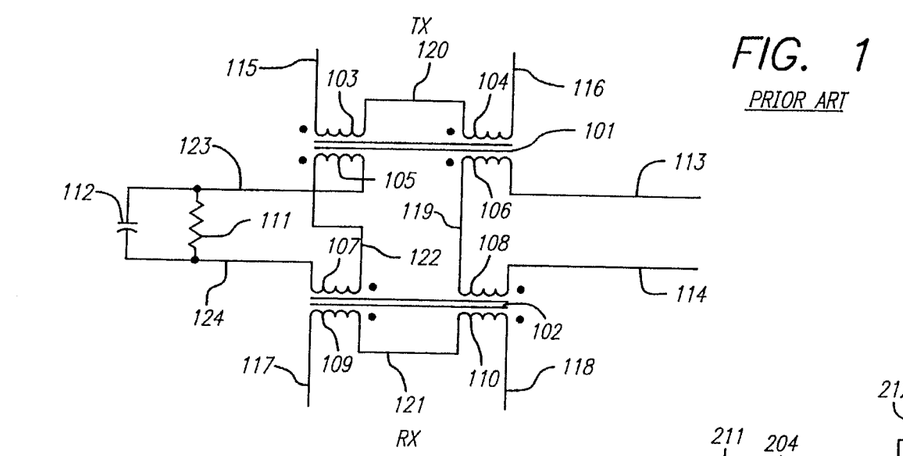
FIG. 1 is a schematic diagram illustrating an example of a transformer based hybrid circuit.

An example of a transformer based hybrid circuit is illustrated in FIG. 1. The circuit includes transformer 101 having windings 103, 104, 105, and 106, transformer 102 having windings 107, 108, 109, and 110, resistor 111, and capacitor 112. A two wire transmit signal interface is provided at nodes 115 and 116. Node 115 is coupled to the first terminal of winding 103. The second terminal of winding 103 is coupled through node 120 to the first terminal of winding 104. The second terminal of winding 104 is coupled to node 116.

A two wire receive signal interface is provided at nodes 117 and 118. Node 117 is coupled to the first terminal of winding 109. The second terminal of winding 109 is coupled through node 121 to the first terminal of winding 110. The second terminal of winding 110 is coupled to node 118.

A two wire bidirectional signal interface is provided at nodes 113 and 114. Node 114 is coupled to the first terminal of winding 108. The second terminal of winding 108 is coupled through node 119 to the first terminal of winding 106. The second terminal of winding 106 is coupled to node 113.

The first terminal of winding 105 is coupled to the first terminal of winding 107. The second terminal of winding 105 is coupled through node 123 to the first terminal of capacitor 112 and to the first terminal of resistor 111. The second terminal of winding 107 is coupled through node 124 to the second terminal of capacitor 112 and to the second terminal of resistor 111.

A transmit signal applied across nodes 115 and 116 is coupled to nodes 122 and 123 by windings 103 and 105 and to nodes 119 and 113 by windings 104 and 106. Current through winding 106 also flows through winding 108 and through the two wire bidirectional interface at nodes 113 and 114. The signal across nodes 114 and 119 is coupled through windings 108 and 110 to nodes 118 and 121.

The current flowing through winding 105 also flows through winding 107 and through the balancing network comprising resistor 111 and capacitor 112. The impedance of the balancing network must be equal to the impedance across nodes 113 and 114 of the two wire bidirectional interface for proper symmetry of the circuit and cancellation of signals in the windings.

The signal at nodes 122 and 124 is coupled to nodes 121 and 117 through windings 107 and 109. Since the current flowing through winding 105, winding 107, and the balancing network comprising resistor 111 and capacitor 112 is the same as the current flowing through winding 106, winding 108, and the two wire bidirectional interface at nodes 113 and 114, the current flowing through winding 109 is equal to the current flowing through winding 110. However, due to the crossed connection between winding 105 and 107, the signal across winding 109 is out of phase with the signal across winding 110. Since the signals are equal but out of phase, they cancel one another out. Thus, the transmit signal is not present across the receive signal interface at nodes 117 and 118.

A signal applied at the two wire bidirectional interface across nodes 113 and 114 flows through windings 106 and 108. The signal at nodes 119 and 113 is coupled to nodes 116 and 120 through windings 106 and 104. The signal at nodes 114 and 119 is coupled to nodes 118 and 121 through windings 108 and 110. Current flowing through winding 110 also flows through winding 109 and through the two wire receive signal interface across nodes 117 and 118.

The signal across nodes 121 and 117 is coupled to nodes 122 and 124 through windings 109 and 107. The signal across nodes 122 and 124 is coupled to nodes 115 and 120 through windings 105 and 103. However, because of the cross connection between winding 107 and winding 105, the signal at nodes 115 and 120 is out of phase with the signal at nodes 120 and 116. Thus, the signal at nodes 115 and 120 cancel the signal at nodes 120 and 116, resulting in no signal across nodes 115 and 116. Thus, a signal applied at the two wire bidirectional interface across nodes 113 and 114 appears across nodes 117 and 118 of the two wire receive signal interface, but not across nodes 115 and 116 of the two wire transmit signal interface.

Transformer based hybrid circuits have many disadvantages. They require specially wound transformers which are large, bulky, heavy and expensive. They require precise matching of the impedance of the matching network to the impedance of the telephone line. Furthermore, their frequency response may be limited and may prevent effective use for high speed data communications.

Figure 2:
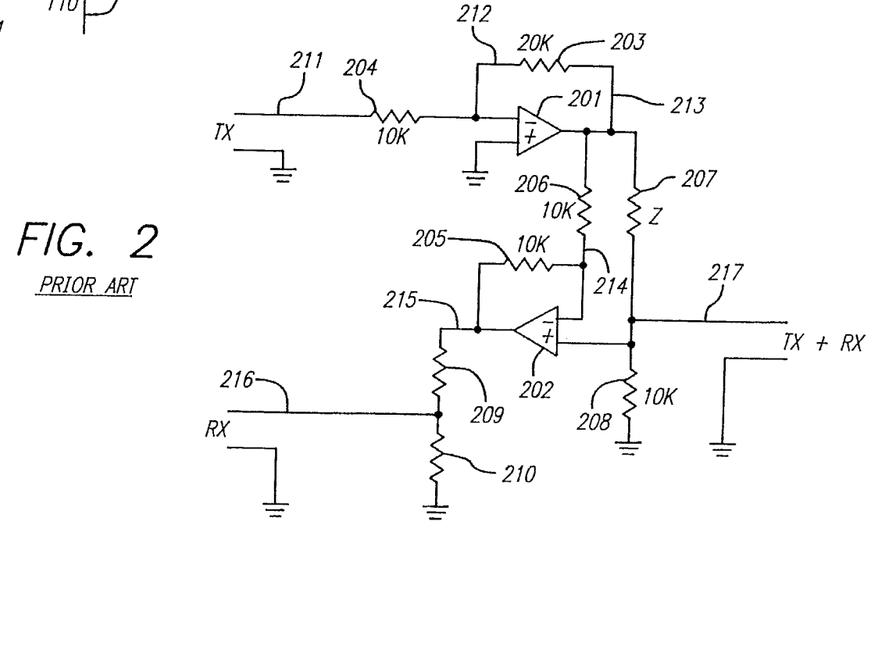
FIG. 2 is a schematic diagram illustrating a hybrid constructed with electronic components.

FIG. 2 illustrates a hybrid constructed with electronic components. This hybrid circuit avoids the need for specially wound transformers. The transmit signal interface includes node 211 and ground. Node 211 is coupled to the first terminal of resistor 204. The second terminal of resistor 204 is coupled through node 212 to the inverting input of operational amplifier (op amp) 201 and to the first terminal of resistor 203. The non-inverting input of op amp 201 is coupled to ground. The output of op amp 201 is coupled through node 213 to the second terminal of resistor 203, to the first terminal of resistor 206, and to the first terminal of resistor 207. The second terminal of resistor 206 is coupled through node 214 to the first terminal of resistor 205 and to the inverting input of op amp 202. The second terminal of resistor 207 is coupled to the non-inverting input of op amp 202, to the first terminal of resistor 208, and to node 217 of the two wire bidirectional interface. The other terminal of the two wire bidirectional interface is coupled to ground.

The output of op amp 202 is coupled to the second terminal of resistor 205 and to the first terminal of resistor 209. The second terminal of resistor 209 is coupled the first terminal of resistor 210 and to node 216 of the receive signal interface. The other terminal of the receive signal interface is coupled to ground. The second terminal of resistor 210 is coupled to ground.

Op amp 201 is configured as an inverting amplifier having a gain of two. A signal applied to the input of op amp 201 is amplified and applied to the voltage divider comprising resistor 207 and the impedance of the telephone line. Since resistor 207 has a value substantially equal to the impedance of the telephone line, and the telephone line impedance is much less than the value of resistor 208, the voltage divider drops half of the voltage across resistor 207 and half across the telephone line. The relatively high impedance of the telephone line leaves the voltage divider ratio substantially unaffected by resistor 208.

Op amp 202 is configured as a differential amplifier and produces an output equal to the input but inverted. The non-inverting input of op amp 202 amplifies one half of the output of op amp 201, but does not invert it. Since the signals are out of phase with one another, they cancel and op amp 202 provides zero output.

When a signal is applied to node 217, op amp 201 does not respond since the signal is coupled to its output. Since the signal is applied to the non-inverting input of op amp 202, the signal appears at the output of op amp 202 and at node 216 of the receive signal interface.

However, the rejection of the transmit signal provided by this circuit is limited by the extent to which resistor 207 matches the impedance of the bidirectional interface between node 217 and ground. Also, this circuit requires power supply voltages substantially higher than the level of the transmit signal. Thus, the amplitude of the transmit signal would be limited for low voltage power supply operation.

SUMMARY OF THE INVENTION

The present invention provides a telephone hybrid circuit. The present invention avoids the need for a large, bulky, specially-wound transformer. Since no transformer is needed, the impedance matching difficulties and bandwidth limitations associated with such a transformer are avoided. Since the present invention allows the telephone line to be driven with the transmit signal using a transconductance driver, the present invention avoids the need for power supply voltages much higher than the amplitude of the transmit signal. Furthermore, the present invention avoids the need for a high voltage isolation barrier between the hybrid circuit and the telephone line.

In the present invention, a telephone line conductor is coupled to a first input and a transmit signal is applied to a second input. A transmit circuit applies the transmit signal to the telephone line conductor. A receive signal, which originates at the opposite end of the telephone line, is also present on the telephone line conductor. Thus, the transmit signal, which appears in phase at both inputs and is a common mode signal, is rejected and does not appear at the receive signal output. However, the receive signal, which does not appear in phase at both inputs and is not a common mode signal, appears at the receive signal output free of interference from the transmit signal.

In the preferred embodiment of the present invention, a telephone line conductor is coupled through a highpass filter element, such as a capacitor, to a differential balancing circuit. The highpass filter element blocks DC current from passing to the differential balancing circuit. A transmit signal is also coupled to the differential balancing circuit through a highpass filter element. The differential balancing circuit includes a voltage divider coupled to the first highpass filter element and a voltage divider coupled to the second highpass filter element. The voltage dividers are coupled to provide an average of the signals from the highpass filter elements as an input to a differential amplifier. A reference voltage is coupled to another input of the differential amplifier. The outputs of the differential amplifier are coupled to the center taps of the voltage dividers and to additional filtering circuitry. The filtering circuitry provides differential output signals. Thus, the present invention avoids the disadvantages of the prior art.

DETAILED DESCRIPTION OF THE INVENTION

A telephone hybrid circuit is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In the past, telephone hybrid circuits have required large, heavy, and bulky transformers, have been limited in performance due to impedance matching problems, have been limited in bandwidth and dynamic range, and have often required electrical isolation from the telephone line. Therefore, a solution for these problems is needed.

The present invention provides a telephone hybrid circuit that avoids the problems of prior art telephone hybrids. According to the present invention, a transconductance driver applies a transmit signal to a telephone line conductor. The telephone line conductor is coupled to one input of a single-ended to differential conversion circuit. The transmit signal is applied to a second input of the single-ended to differential conversion circuit. Both the transmit signal and receive signal are present on the telephone line conductor, and, therefore, on the first input of the single-ended to differential conversion circuit, but only the transmit signal is present on the second input of the single-ended to differential conversion circuit. Since the transmit signal is present on both inputs, it is a common mode signal and is cancelled out. However, since the receive signal is not a common mode signal, it is not cancelled out, but appears at the output of the single-ended to differential conversion circuit. Thus, the present invention provides for the application of the transmit signal to the telephone line and for the reception of a receive signal free of interference from the transmit signal.

Figure 3:
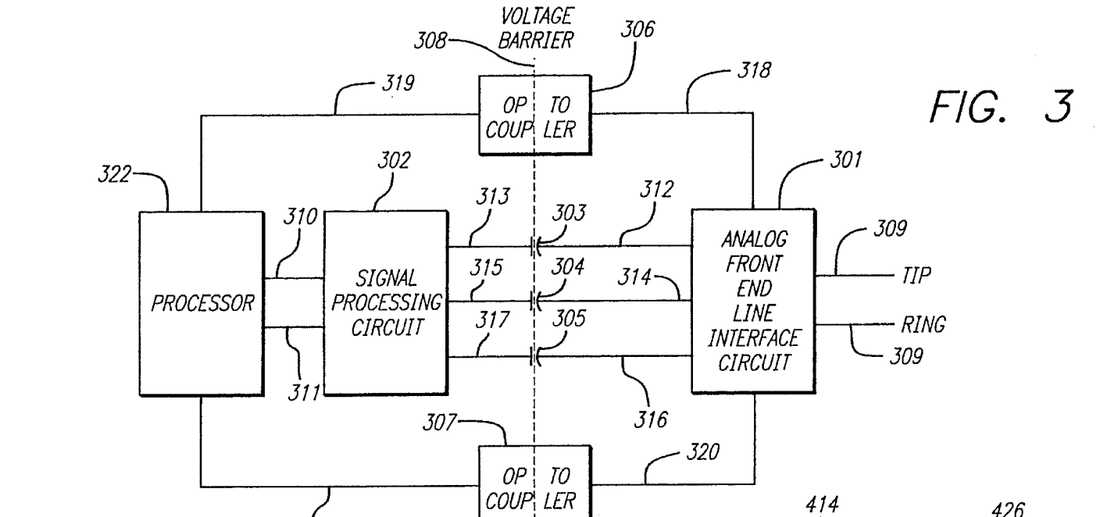
FIG. 3 is a block diagram illustrating an example of a system with which the present invention may be practiced.

FIG. 3 is a block diagram illustrating an example of a system with which the present invention may be practiced. The system may be used to implement a modem for communication of digital information over a telephone line. A tip and ring conductors of telephone line 309 are coupled to analog front end line interface circuit 301. Analog front end line interface circuit 301 is coupled through node 312 to a first terminal of capacitor 303, through node 314 to a first terminal of capacitor 304, and through node 316 to a first terminal of capacitor 305. Analog front end line interface circuit 301 is also coupled through node 318 to optocoupler 306 and through node 320 to optocoupler 307. Capacitors 303, 304, and 305 and optocouplers 306 and 307 maintain high voltage barrier 308.

Signal processing circuit 302 is coupled through node 313 to a second terminal of capacitor 303, through node 315 to a second terminal of capacitor 304, and through node 317 to a second terminal of capacitor 305. Processor 322 is also coupled through node 319 to optocoupler 306 and through node 321 to optocoupler 307.

Signal processing circuit 302 is coupled through nodes 310 and 311 to processor 322. Signal processing circuit 302 may be a digital signal processing (DSP) circuit or other signal processing circuitry, such as a D/A converter. Processor 322 may be a central processing unit (CPU), microcontrol unit (MCU), such as a single IC microcontroller, or any other type of digital processor.

The present invention may be practiced with analog front end line interface circuit 301. The hybrid circuit of the present invention may be coupled to the tip and ring conductors of telephone line 309 to transmit a transmit signal to telephone line 309, to receive a combined signal from telephone line 309, and to provide a receive signal to signal processing circuit 302. Transmit, receive, and clock signals may be coupled across capacitors 303, 304, and 305 between analog front end line interface circuit 301 and signal processing circuit 302. Control signals may be coupled through optocouplers 306 and 307 between analog front end line interface circuit 301 and processor 322. Signals representing information derived from the receive signal or used to derive the transmit signal may be coupled through nodes 310 and 311 between processor 322 and signal processing circuit 302.

Figure 4:
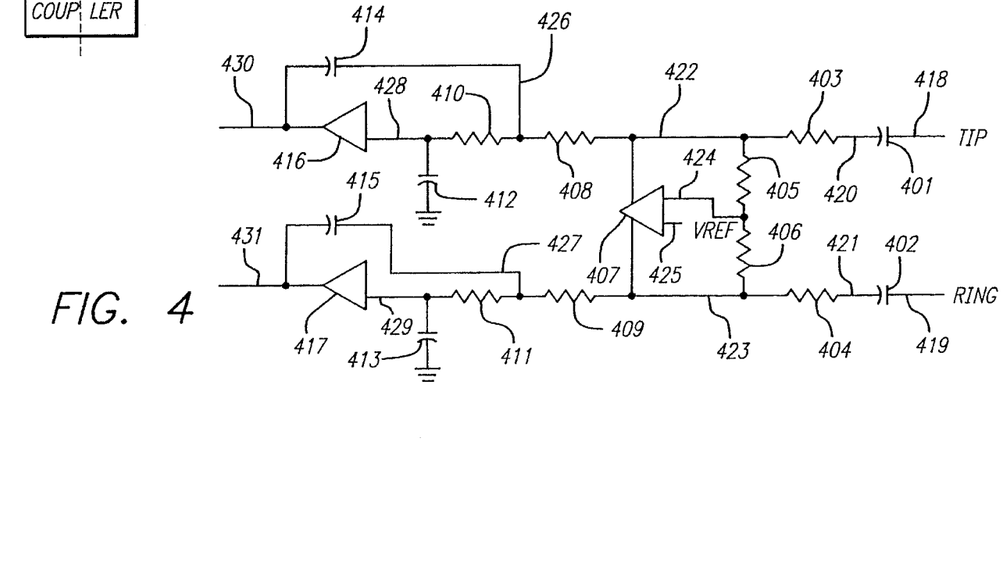
FIG. 4 is a schematic diagram of a circuit for providing single to differential conversion according to the present invention.

FIG. 4 is a schematic diagram of a circuit for providing single to differential conversion according to the present invention. A telephone line comprises tip conductor 418 and ring conductor 419. Tip conductor 418 is coupled to the first terminal of capacitor 401. The second terminal of capacitor 401 is coupled through node 420 to the first terminal of resistor 403. The second terminal of resistor 403 is coupled through node 422 to the first terminal of resistor 405, to the first output of amplifier 407, and to the first terminal of resistor 408.

Ring conductor 419 is coupled to the first terminal of capacitor 402. The second terminal of capacitor 402 is coupled through node 421 to the first terminal of resistor 404. The second terminal of resistor 404 is coupled through node 423 to the first terminal of resistor 406, to the second output of amplifier 407, and to the first terminal of resistor 409.

The second terminal of resistor 405 is coupled to the second terminal of resistor 406 and to an input of amplifier 407. Reference voltage VREF at node 425 is coupled to another input of amplifier 407.

The second terminal of resistor 408 is coupled to the first terminal of resistor 410 and to the first terminal of capacitor 414. The second terminal of resistor 410 is coupled to the first terminal of capacitor 412 and to an input of amplifier 416. The second terminal of capacitor 412 is coupled to ground. The output of amplifier 416 is coupled to the second terminal of capacitor 414 and to output 430.

The second terminal of resistor 409 is coupled to the first terminal of resistor 411 and to the first terminal of capacitor 415. The second terminal of resistor 411 is coupled to the first terminal of capacitor 413 and to an input of amplifier 417. The second terminal of capacitor 413 is coupled to ground. The output of amplifier 417 is coupled to the second terminal of capacitor 415 and to output 431.

Signals on telephone line tip conductor 418 and ring conductor 419 are AC coupled through capacitors 401 and 402 and resistively coupled through resistors 403 and 404 to the voltage divider that comprises resistors 405 and 406 and provides an input to amplifier 407. The voltage divider averages the voltages at nodes 422 and 423, providing the voltage about which the differential voltages at nodes 422 and 423 are centered. Amplifier 407 compares this voltage to reference voltage VREF and provides an output to both nodes 422 and 423 to adjust the center voltage. After having been AC coupled and balanced about VREF, the differential signal is applied to a pair of controlled-source low-pass active filters that provide a differential output signal across nodes 430 and 431.

Figure 5:
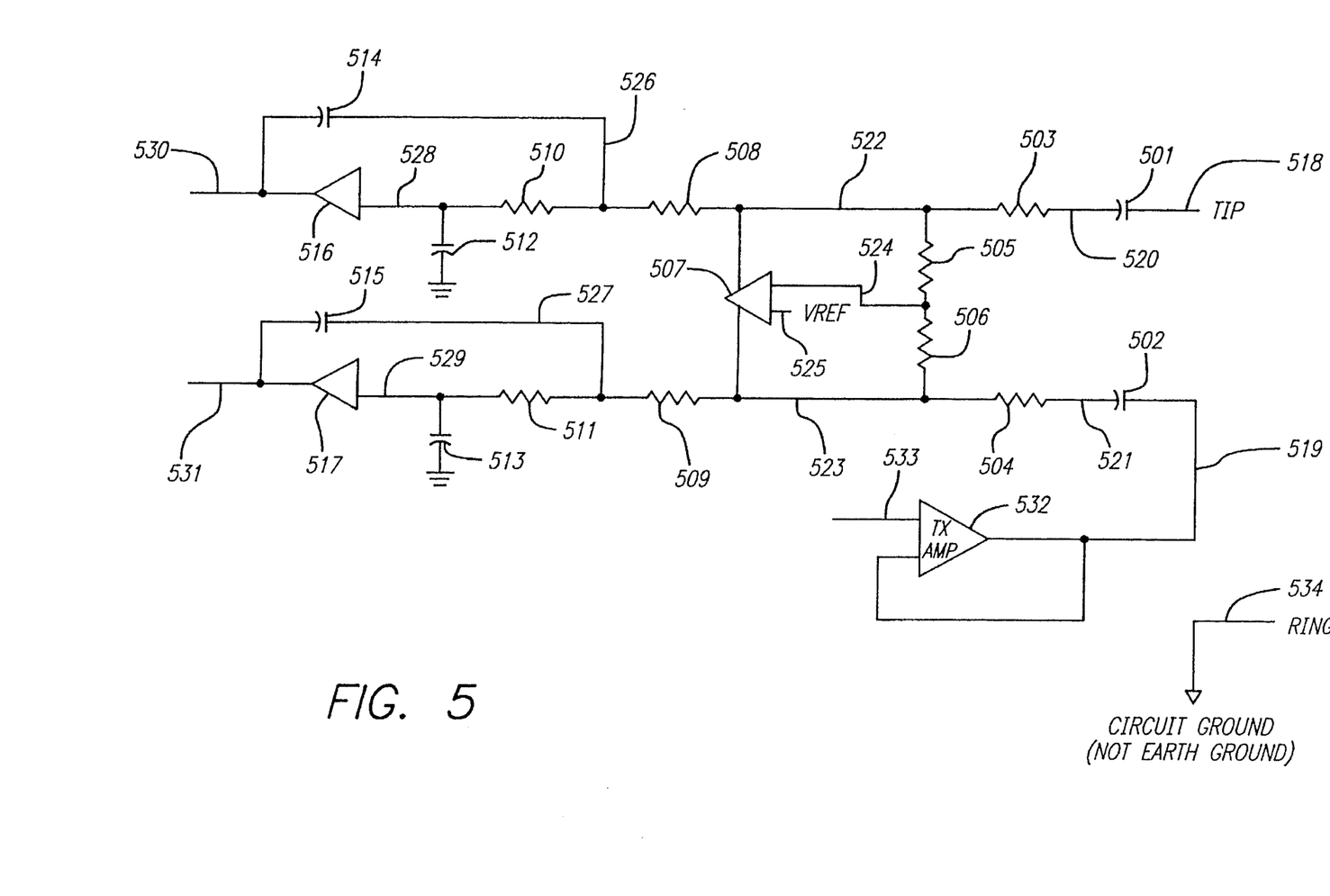
FIG. 5 is a schematic diagram of the preferred embodiment of the present invention.

FIG. 5 is a diagram of the preferred embodiment of the present invention. A telephone line comprises tip conductor 518 and ring conductor 534. Tip conductor 518 is coupled to the first terminal of capacitor 501. The second terminal of capacitor 501 is coupled through node 520 to the first terminal of resistor 503. The second terminal of resistor 503 is coupled through node 522 to the first terminal of resistor 505, to the first output of amplifier 507, and to the first terminal of resistor 508.

Ring conductor 534 is coupled to circuit ground, which is isolated from earth ground and may have a different potential than earth ground. Transmit signal input 533 is coupled to an input of transmit amplifier 532. The output of transmit amplifier 532 is coupled through node 519 to an input of transmit amplifier 532 and to the first terminal of capacitor 502. The second terminal of capacitor 502 is coupled through node 521 to the first terminal of resistor 504. The second terminal of resistor 504 is coupled through node 523 to the first terminal of resistor 506, to the second output of amplifier 507, and to the first terminal of resistor 509.

The second terminal of resistor 505 is coupled to the second terminal of resistor 506 and to an input of amplifier 507. Reference voltage VREF at node 525 is coupled to another input of amplifier 507.

The second terminal of resistor 508 is coupled to the first terminal of resistor 510 and to the first terminal of capacitor 514. The second terminal of resistor 510 is coupled to the first terminal of capacitor 512 and to an input of amplifier 516. The second terminal of capacitor 512 is coupled to ground. The output of amplifier 516 is coupled to the second terminal of capacitor 514 and to output 530.

The second terminal of resistor 509 is coupled to the first terminal of resistor 511 and to the first terminal of capacitor 515. The second terminal of resistor 511 is coupled to the first terminal of capacitor 513 and to an input of amplifier 517. The second terminal of capacitor 513 is coupled to ground. The output of amplifier 517 is coupled to the second terminal of capacitor 515 and to output 531.

The circuit of FIG. 5 takes advantage of the fact that the circuit ground is isolated from earth ground and any ground associated with computer equipment or other equipment with which the present invention is used. Rather, the circuit ground is coupled to telephone line ring conductor 534, as illustrated. Since the circuit ground is isolated from other grounds, it floats at the voltage of telephone line ring conductor 534 and may be used in conjunction with telephone line tip conductor 518 as a differential signal path.

When a receive signal is present on the telephone line, it exists differentially across tip conductor 518 and ring conductor 534, or, equivalently, across tip conductor 518 and the circuit ground. Since transmit amplifier 532 provides as its output the transmit signal relative to ground, node 519 remains at ground unless a transmit signal is present. Since ground floats at the voltage of ring conductor 534, node 519 remains at the voltage of ring conductor 534 unless a transmit signal is present. Thus, the voltages of the tip and ring conductors are applied differentially across the first terminals of capacitors 501 and 502, respectively, causing the differential circuitry to provide differential receive signals across outputs 530 and 531.

The present invention uses a FET cascode circuit to apply a transmit signal to tip conductor 518. Transmit amplifier 532 provides the transmit signal to node 519, which serves as an input to the differential circuitry that is complementary to tip conductor 518. Thus, the transmit signal appears in phase at both tip conductor 518 and node 519, the complementary inputs to the differential circuitry, and is rejected as a common mode signal. Thus, the transmit signal does not appear across outputs 530 and 531 of the differential circuitry.

Since ring conductor 534 is coupled to ground, tip conductor 518 is a single-ended or non-differential input to the differential circuitry. Also, the transmit signal at node 519 is a single-ended or non-differential signal. The circuit of the present invention provides differential outputs 530 and 531. Thus, the present invention provides conversion between single ended inputs and differential outputs.

Furthermore, the present invention provides wide dynamic range at low power supply voltages. Usually, low power supply voltages limit the maximum amplitude of the transmit signal since the power supply voltages must normally be at least as high as the amplitude of the signal. Furthermore, voltage drops inherent in devices used to process a signal, such as semiconductors, often reduce the upper limit of amplitude of a signal being processed. Also, the output stages of some circuits impose additional limits on the amplitude of the outputs of the circuits, further constraining the dynamic range of the circuits. However, by applying the transmit signal to the telephone line using a MOSFET transconductance circuit, the transmit signal may be applied to the telephone line at higher amplitude with lower power supply voltages.

Figure 6:
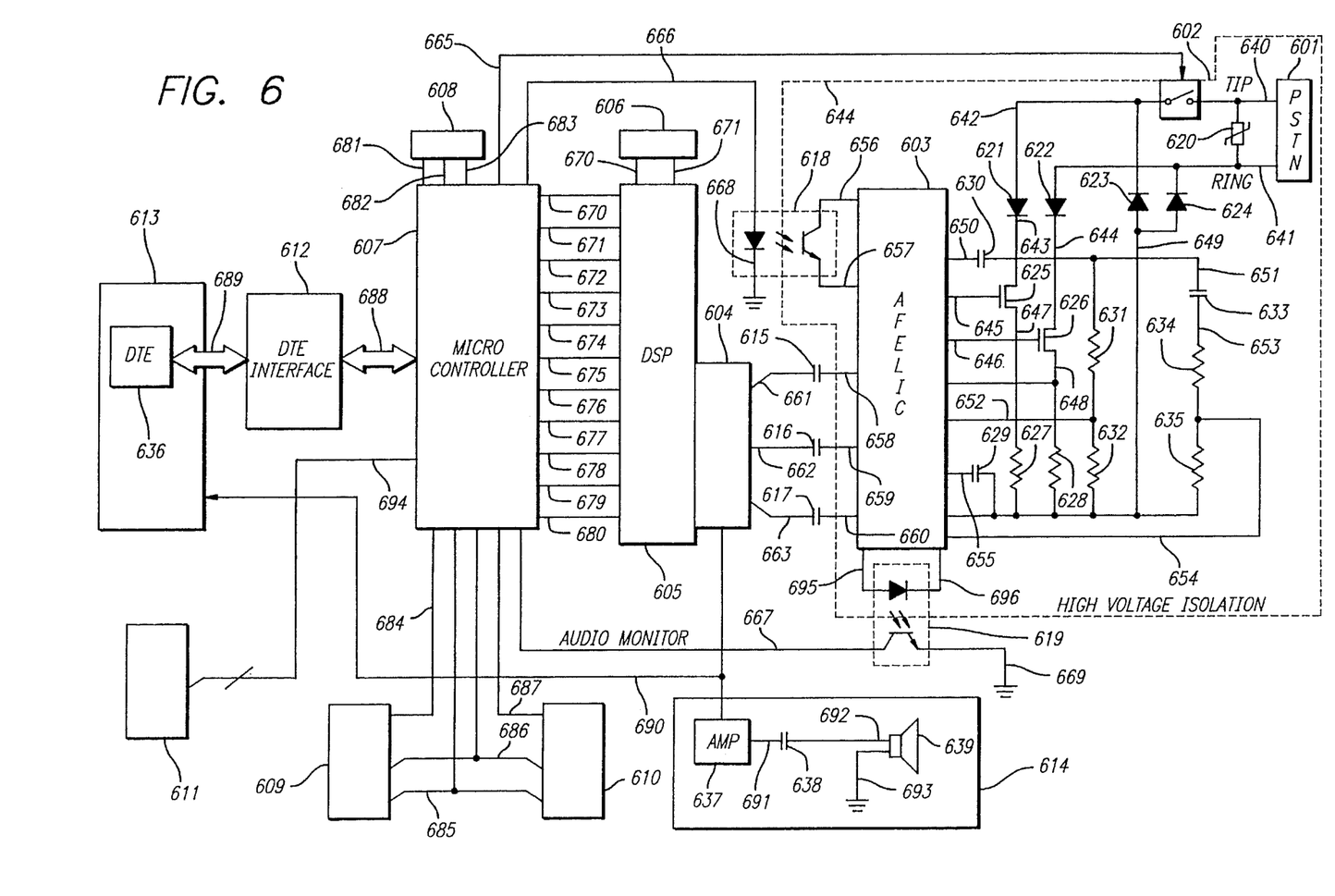
FIG. 6 is a diagram of a system that comprises an embodiment of the present invention.

FIG. 6 is a diagram of a system that comprises an embodiment of the present invention. Tip connector 640 and ring conductor 641 are coupled to public switched network 601. Protector 620, which may be a varistor, such as a metal oxide varistor (MOV), or a sidactor, is coupled across tip conductor 640 and ring conductor 641. Tip conductor 640 is coupled to a first terminal of hook switch 602. A second terminal of hook switch 602 is coupled to node 642. Node 642 is coupled to the anode of diode 621 and to the cathode of diode 623. Ring conductor 641 is coupled to the anode of diode 622 and to the cathode of diode 624. The anode of diode 623 is coupled to the anode of diode 624 at node 649. The cathode of diode of 621 is coupled to node 643 and to the first terminal of field effect transistor (FET) 625. The gate of FET 625 is coupled to node 645 and to analog front end line interface circuit 603. The second terminal of FET 625 is coupled to node 647, to analog front end line interface circuit (AFELIC) 603, and to the first terminal of resistor 627. The cathode of diode 622 is coupled to node 644 and to the first terminal of FET 626. The gate of FET 626 is coupled to node 646 and to AFELIC 603. The second terminal of FET 626 is coupled to node 648, to AFELIC 603 and to the first terminal of resistor 628.

AFELIC 603 is coupled to node 650 and to the first terminal of capacitor 630. The second terminal of capacitor 630 is coupled to the first terminal of resistor 631 and to the first terminal of capacitor 633 at node 651. The second terminal of resistor 631 is coupled to AFELIC 603 and to the first terminal of resistor 632. The second terminal of capacitor 633 is coupled to node 653 and to the first terminal of resistor 634. The second terminal of resistor 634 is coupled to node 654 and to AFELIC 603. The second terminal of resistor 634 is also coupled to the first terminal of resistor 635. AFELIC 603 is coupled to node 655 and to the first terminal of capacitor 629. The second terminal of capacitor 629 is coupled to AFELIC 603. The second terminal of resistor 627, the second terminal of resistor 628, the second terminal of resistor 632 and the second terminal of resistor 635.

AFELIC 603 is coupled to node 695, which is coupled to the anode of the LED of optocoupler 619. The cathode of the LED of optocoupler 619 is coupled to node 696, which is coupled to AFELIC 603. AFELIC 603 is coupled to node 656, which is coupled to the collector of the photo transistor of optocoupler 618. The emitter of the photo transistor of optocoupler is coupled to node 657, which is coupled to AFELIC 603. AFELIC 603 is coupled to node 658, node 659, and node 660. Node 658 is coupled to the first terminal of capacitor 615. Node 659 is coupled to the first terminal of capacitor 656. Node 660 is coupled to the first terminal of capacitor 617. The above-described circuitry is illustrated as contained within high voltage isolation barrier 664. The high voltage isolation barrier provides the necessary isolation between the voltages that may be present on the public switched telephone network 601 and the host system 613.

The second terminal of capacitor 615 is coupled to node 661, which is coupled to analog front end interface (AFE interface) 604. The second terminal of capacitor 616 is coupled to node 662, which is coupled to AFE interface 604. The second terminal of capacitor 617 is coupled to node 663, which is coupled to AFE interface 604. AFE interface 604 provides an analog audio monitor signal at node 690. Node 690 is coupled to host block 613 and to amplifier 637 of audio output block 614. Amplifier 637 provides an output signal at node 691 which passes through capacitor 638 to appear at node 692. Node 692 is coupled to the first terminal of speaker 639. The second terminal of speaker 639 is coupled to node 693, which is coupled to ground. Audio output block 614 comprises amplifier 637, capacitor 638, and speaker 639. The audio monitor signal at node 690 is coupled to host block 613. AFE interface 604 is coupled to DSP block 605.

DSP block 605 is coupled through nodes 670 and 671 to block 606. DSP block 605 is also coupled to microcontroller 607 through nodes 670, 671, 672, 673, 674, 675, 676, 677, 678, 679, and 680. Microcontroller 607 is coupled through node 665 to the control terminal of hook switch 602. Microcontroller 607 is also coupled through node 666 to the anode of the LED of optocoupler 618. The cathode of the LED of optocoupler 618 is coupled to node 668, which is coupled to ground. Microcontroller 608 is coupled through node 667 to the collector of the phototransistor of optoisolator 619. The emitter of the phototransistor of optoisolator 619 is coupled to node 669, which is coupled to ground.

Microcontroller 607 is coupled through nodes 681, 682, and 683 to block 608. Microcontroller 607 is coupled through nodes 684, 684, 685, 686, and 687 to block 609 and block 610. Microcontroller 607 is coupled through bus 694 to block 611. Microcontroller 607 is coupled through bus 688 to DTE interface 612. DTE interface 612 is coupled through bus 689 to the DTE circuit 636 of host system 613.

Figures 7, 7A:
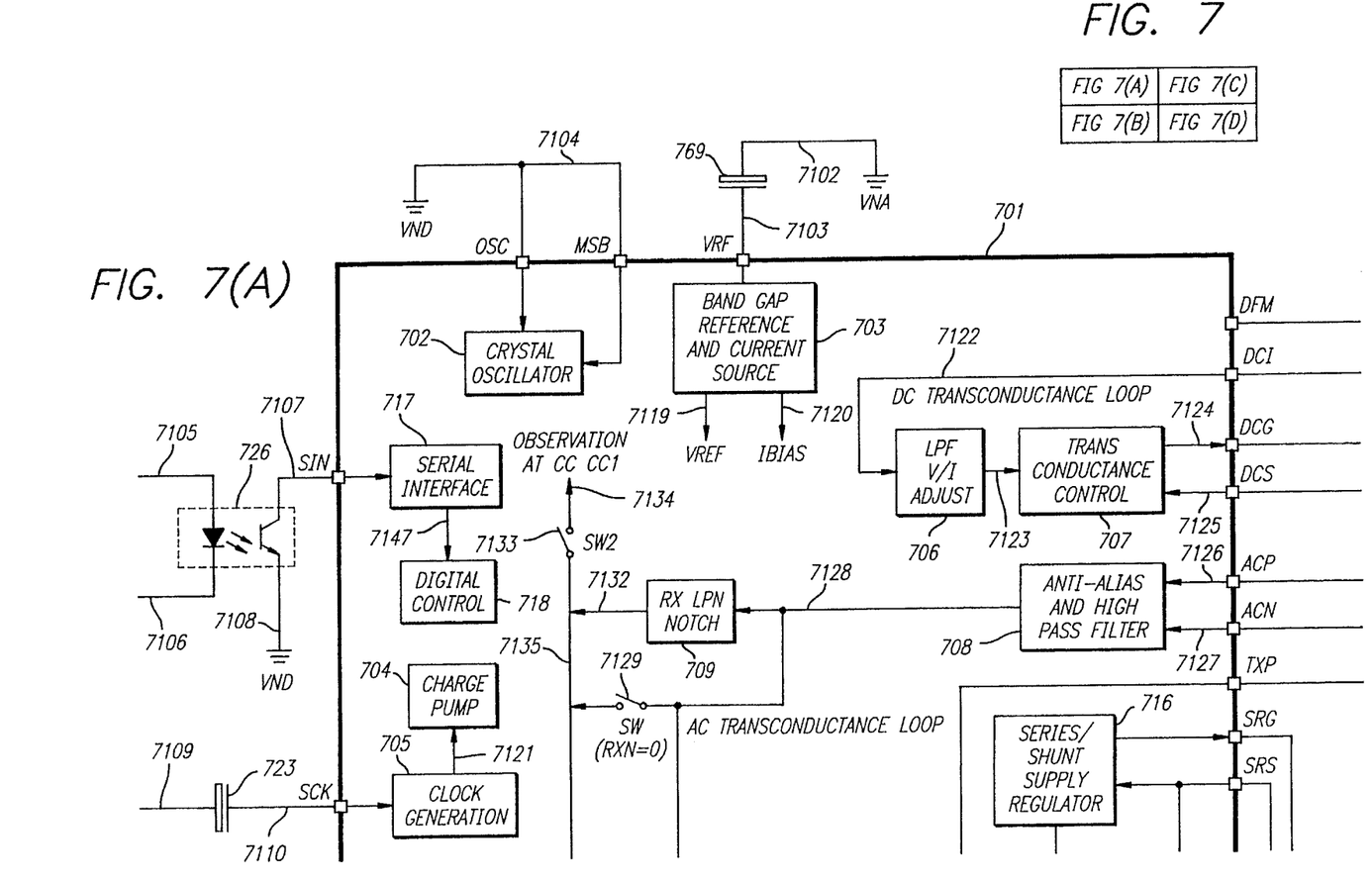
FIGS. 7 through 7D are schematic diagrams illustrating a circuit comprising an embodiment of the present invention.
Figure 7B:
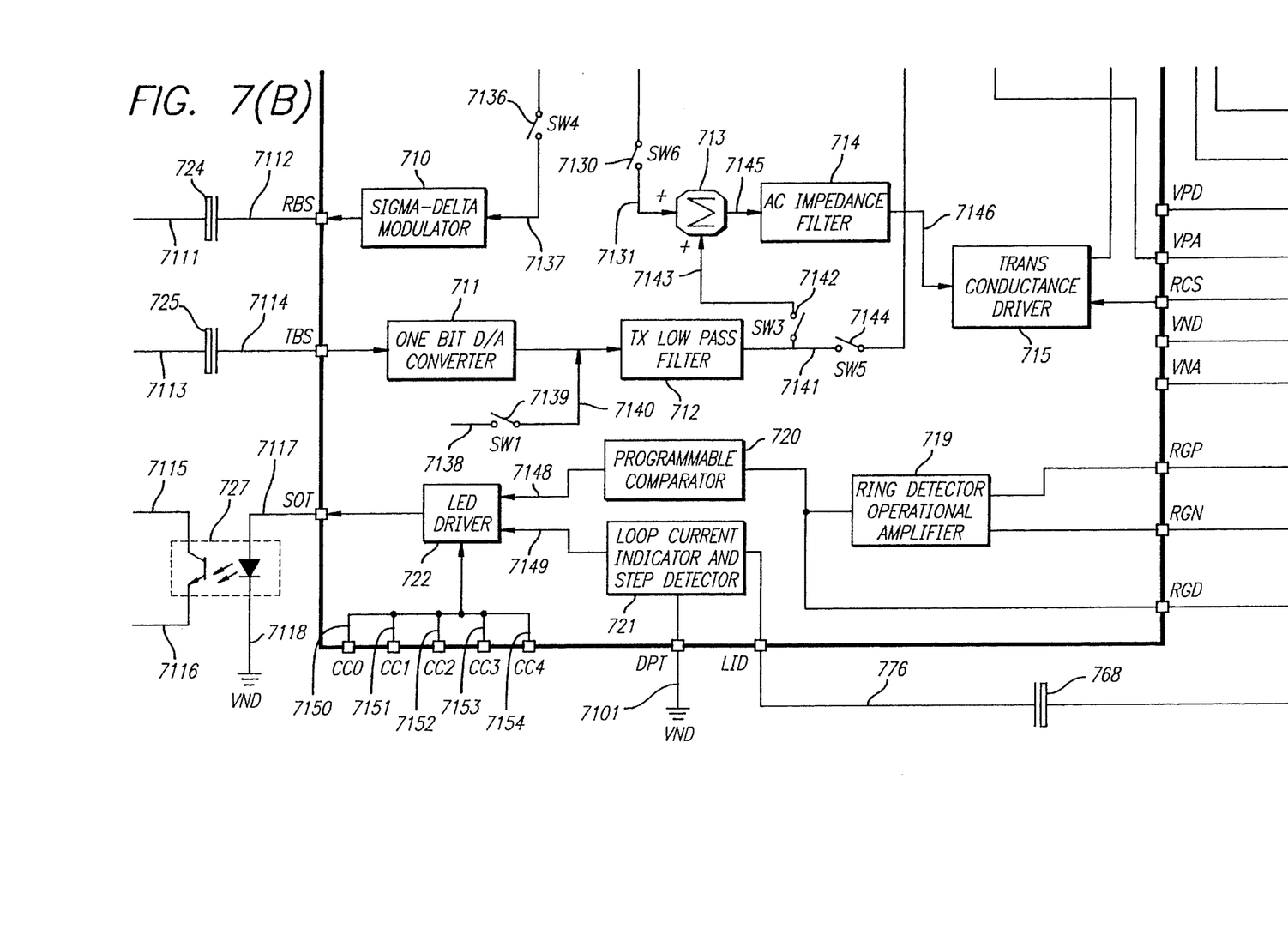
Figure 7C:
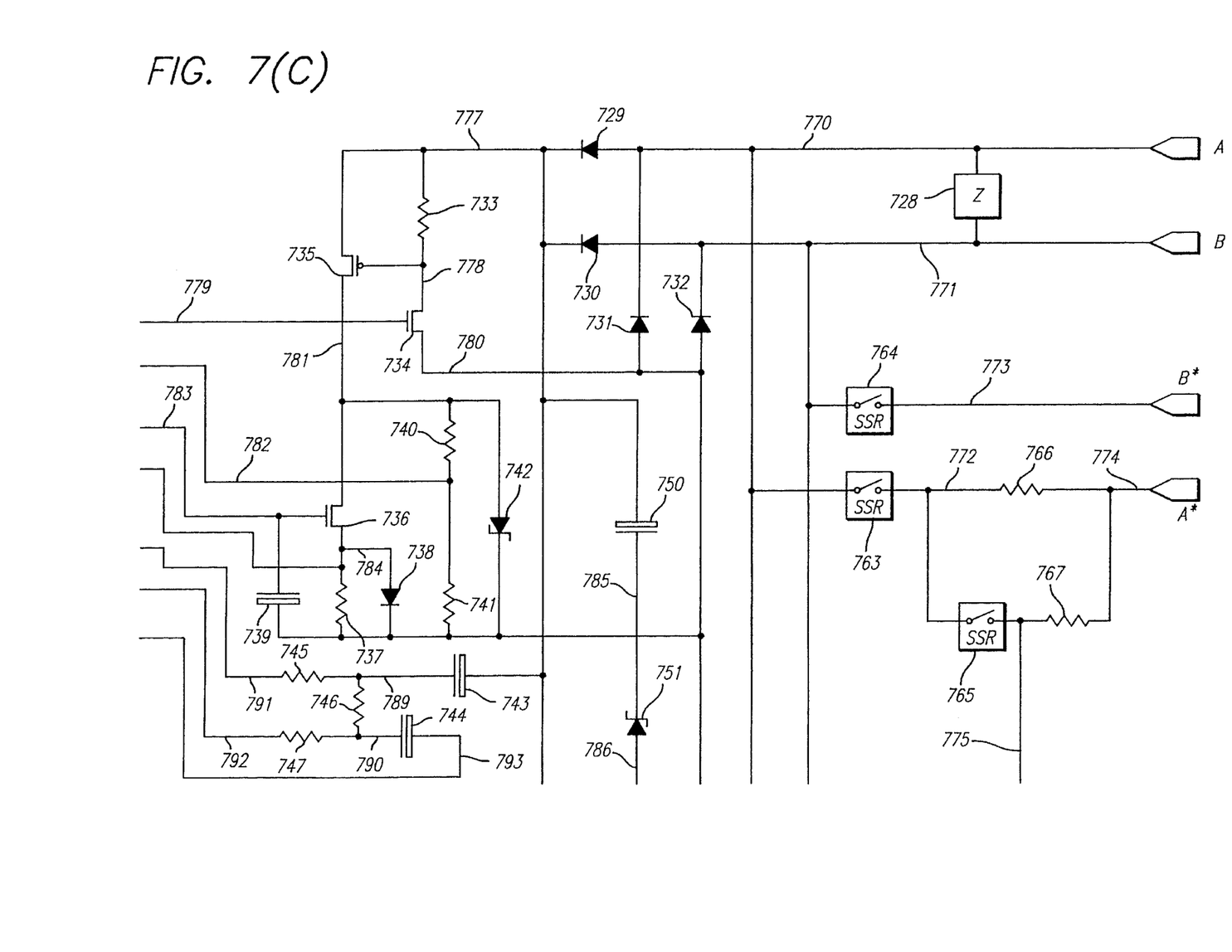
Figure 7D:
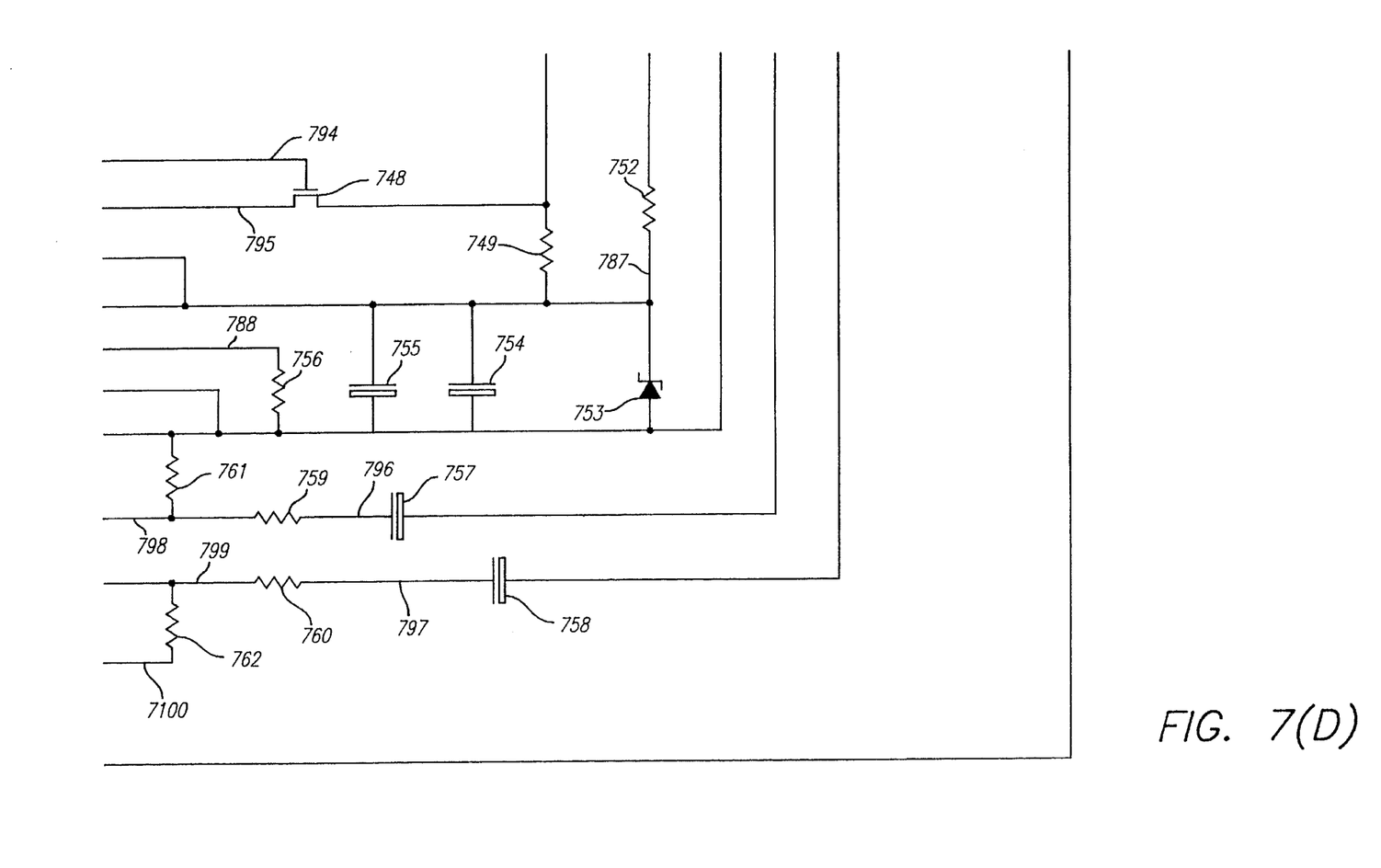

FIGS. 7 through 7D are schematic diagrams illustrating a circuit comprising an embodiment of the present invention. Analog front end line interface circuit 701 comprises crystal oscillator 702, bandgap reference and current source 703, charge pump 704, clock generation block 705, low pass filter V/I adjustment block 706, transconductance control block 707, anti alias and high pass filter block 708, receive low pass and notch filter block 709, sigma-delta modulator 710, one bit D/A converter 711, transmit low pass filter 712, summer 713, AC impedance filter 714, transconductance driver 715, series/shunt supply regulator 716, serial interface 717, digital control block 718, ring detector operational amplifier 719, programmable comparator 720, loop current indicator and step detector 721, and photodiode driver 722.

The two conductors of a telephone line are coupled to nodes 770 and 771. Protector 728, which may be a varistor, metal oxide varistor (MOV), or a sidactor, is coupled across telephone line conductors 770 and 771. Telephone line conductor 770 is coupled to the anode of diode 729, the cathode of diode 731, the first terminal of solid state relay 763, and the first terminal of capacitor 757. Telephone line conductor 771 is coupled to the anode of diode 730, to the cathode of diode 732, to the first terminal of solid state relay 764, and to the first terminal of capacitors 758. The second terminal of solid state relay 764 is coupled to node 773. The second terminal of solid state relay 763 is coupled to node 772. Node 772 is coupled to the first terminal of solid state relay 765, and to the first terminal of resistor 766. The second terminal of solid state relay 765 is coupled to the first terminal of resistor 767 and to the first terminal of capacitor 768. The second terminal of resistor 766 is coupled to node 774 and to the second terminal of resistor 767

The second terminal capacitor 768 is coupled through node 776 to loop current indicator and step detector 721. Loop current indicator and step detector 721 is coupled through node 7101 to voltage VND, which is a digital ground. Loop current indicator and step detector 721 is coupled through node 7149 to photodiode driver 722. The second terminal of capacitor 757 is coupled through node 796 to the first terminal of resistor 759. The second terminal of capacitor 758 is coupled through node 797 to the first terminal of capacitor 760. The second terminal resistor 759 is coupled through node 798 to the first terminal of resistor 761 and to an input of ring detection operational amplifier 719. The second terminal of resistor 760 is coupled through node 799 to the first terminal of resistor 762 and to an input of ring detection operational amplifier 719. The second terminal of resistor 761 is coupled to node 780, which is coupled to voltages VNA and VND, which are analog and digital grounds, respectively.

The second terminal of resistor 762 is coupled through node 7100 to the output of ring detection operational amplifier 719 and to an input of programmable comparator 720. The output of programmable comparator 720 is coupled through node 7148 to LED driver 722. Inputs CC0, CC1, CC2, CC3, and CC4, which appear at nodes 7150, 7151, 7152, 7153, and 7154, respectively, are coupled to LED driver 722. The output of LED driver 722 is coupled through 7117 to the anode of the LED of optocoupler 727. The cathode of the LED of optocoupler 727 is coupler through node 7118 to voltage VND, which a digital ground. Node 1115 is coupled to the collector of the phototransistor optocoupler 727. The emitter of the phototransistor of optocoupler 727 is coupled to node 7116.

Node 7105 is coupled to the anode the LED of optocoupler 726. The cathode of the LED of optocoupler 726 is coupled to node 7106. The emitter of the phototransistor of optocoupler 726 is coupled through node 7108 to voltage VND, which is a digital ground. The collector of the phototransistor of optocoupler 726 is coupled through node 7107 to an input of serial interface 717. The output serial interface 717 is coupled through node 7147 to digital control block 718.

Voltage VND, which is a digital ground, is coupled through node 7104 to crystal oscillator 702. Bandgap current source 703 is coupled through node 7103 to the first terminal of capacitor 769. The second terminal of capacitor 769 is coupled through node 7102 to voltage VNA, which is an analog ground. Bandgap current source 703 provides voltage VREF at nodes 7119 and current IBIAS at node 7120.

The cathode of diode 729 is coupled through node 777 to the first terminal of PMOS FET 735, to the first terminal of resistor 733, to the cathode of diode 730, to the first terminal of capacitor 750, to the first terminal of capacitor 743, to the first terminal of resistor 749, and to the first terminal of NMOS FET 748. The second terminal of resistor 733 is coupled through node 778 to the gate terminal PMOS FET 735, and to the first terminal of NMOS FET 734. The second terminal of PMOS FET 735 is coupled through node 781 to the first terminal of NMOS FET 736, to the first terminal of resistor 740, and to the cathode of zener diode 742.

Output DFM of analog front end interface circuit 701 is coupled through node 779 to the gate of NMOS FET 734.

The second terminal of resistor 740 is coupled through node 782 to input DCI of analog front end line interface circuit 701. Input DCI is coupled though node 7122 to an input of low-pass filter and voltage/current (V/I) adjustment block 706. An output of low pass filter and V/I adjustment block 706 is coupled through node 7123 to an input of transconductance control block 707. The second terminal of resistor 740 is also coupled to the first terminal of resistor 741. An output of transconductance control block 707 is coupled through nodes 7124 to output OCG. Output OCG of AFELIC 701 is coupled through node 783 to the gate of NMOS FET 736 and to the first terminal of capacitor 739. The second terminal of NMOS FET 736 is coupled through node 784 to the anode of diode 738, to the first terminal of resistor 737, and to input DCS of AFELIC 701. Input DCS is coupled through node 7125 to transconductance control block 707.

Node 7109 is coupled to the first terminal of capacitor 723. The second terminal of capacitor 723 is coupled through node 7110 to clock generation circuit 705. The output of clock generation circuit 705 is coupled through node 7121 to an input of charge pump 704.

Node 7113 is coupled to the first terminal of capacitor 725. The second terminal of capacitor 725 is coupled through node 7114 to an input of one bit digital to analog (D/A) converter 711. The output of one bit D/A converter 711 is coupled through node 7140 to an input of transmit low pass filter 712. The drive point signal at inputs CC3 and CC4 are coupled through node 7138 to the first terminal of switch 7139. The second terminal of switch 7139 is coupled through node 7140 to transmit low pass filter 712. The output of transmit low pass filter 712 is coupled through nodes 7141 to the first terminal of switch 7142 and to the first terminal of switch 7144. The second terminal switch 7142 is coupled through node 7143 to a non inverting input of summer 713. The second terminal of switch 7144 is coupled through node 793 to the first terminal of capacitor 744.

The second terminal of capacitor 743 is coupled through node 789 to the first terminal of resistor 746 and to the first terminal of resistor 745. The second terminal of capacitor 744 is coupled through node 790 to the second terminal resistor 746 and to the first terminal of resistor 747. The second terminal of resistor 745 is coupled through node 791 to input ACP of AFELIC 701. Input ACP is coupled through node 7126 to an input of anti alias and high pass filter 708. The second terminal of resistor 747 is coupled through node 792 to input ACN of AFELIC 701. Input ACN is coupled through node 7127 to an input of anti alias and high pass filter 708.

The output of anti alias and high pass filter 708 is coupled through node 7128 to an input of low pass and notch filter 709, to the first terminal of switch 7129, and to the first terminal of switch 7130. The second terminal of switch 7130 is coupled through node 7131 to a non inverting input of summer 713.

The output of receive low pass and notch filter 709 is coupled through node 7132 to the first terminal of switch 7133, and through node 7135 to the first terminal of switch 7136. The second terminal of switch 7129 is also coupled to the first terminal of switch 7133 and the first terminal of switch 7136. The second terminal of switch 7133 is coupled through node 7134 to an observation signal at input CC0 and CC1. The second terminal of switch 7136 is coupled through node 7137 to an input of sigma delta modulator 710. The output of sigma delta modulator 710 is coupled through node 7112 to the first terminal of capacitor 724. The second terminal of capacitor 724 is coupled to node 7111.

The output of summer 713 is coupled through node 7145 to the input of AC impedance filter 714. The output of AC impedance filter is coupled through node 7146 to a first input of transconductance driver 715. A second input of transconductance driver 715 is coupled through node 788 to the first terminal of resistor 756. The output of transconductance driver 715 is coupled to an input of series/shunt supply regulator 716. The second terminal of NMOS FET 748 is coupled through node 795 to an input of series/shunt supply regulator 716. An output of series/shunt supply regulator 716 is coupled through node 794 to the gate terminal of NMOS FET 748.

The second terminal of capacitor 750 is coupled through node 785 to the cathode of zener diode 751. The anode of zener diode 751 is coupled through node 786 to the first terminal of resistor 752.

Series/shunt supply regulator 716 is coupled to voltages VPA and VPD, which are analog and digital supply voltages, respectively. Voltages VPA and VPD are also coupled through node 787 to the second terminal of resistor 749, to the second terminal of resistor 752, to the first terminal of capacitor 755, to the first terminal of capacitor 754, and to the cathode of zener diode 753.

The second terminal of NMOS FET 734 is coupled through node 780 to the anode of diode 731, to the anode of diode 732, to the anode zener diode 742, to the second terminal of resistor 741, to the cathode of diode 738, to the second terminal of resistor 737, to the second terminal of capacitor 739, to the anode of zener diode 753, to the second terminal of capacitor 754, to the second terminal of capacitor 755, to the second terminal of resistor 756, and to voltages VNA and VND, which are analog and digital grounds, respectively.

The telephone line which comprises conductors 770 and 771 is full-wave rectified by diodes 729, 730, 731, and 732 to provide a negative voltage at the anodes of diodes 731 and 732 and a positive voltage at the cathodes of diodes 729 and 730. The negative voltage at the anodes of diodes 731 and 732 is coupled to voltage VND and voltage VNA. Thus, the negative voltage at the anodes of diodes 731 and 732 is used as both an analog and digital ground. The positive voltage at the cathodes of diodes 729 and 730 is regulated by series/shunt supply regulator 716 to provide voltages VPA and VPD, the positive analog and digital supply voltages respectively.

A sigma-delta modulated transmit signal at node 7113 is coupled through capacitor 725 to one bit D/A converter 711. One bit D/A converter 711 converts the sigma-delta bit stream to an analog signal. Transmit low pass filter 712 filters the analog signal to reduce quantization noise. The filtered analog transmit signal is provided to summer 713 and is also applied to a single-ended to differential conversion circuit comprising capacitors 743 and 744 and resistors 745, 746, and 747. The differential input signal from the single-ended to differential conversion network is applied to anti-alias and high-pass filter 708, which removes components of the signal that would otherwise be aliased during sigma-delta modulation. The filtered signal is passed through receive low-pass and notch filter 709 to sigma-delta modulator 710. Receive low-pass and notch filter 709 may be bypassed by switch 7129. Sigma-delta modulator 710 produces a sigma-delta bit stream of the receive signal that is coupled through capacitor 724 to node 7111.

Since the transmit signal at node 793 is a single ended signal referenced to voltage VNA, which is derived from the negative side of the telephone line, and the signal at node 777 is derived from the positive side of the telephone line, the signal applied to capacitor 743 has a voltage equal to the voltage of the positive side of the telephone line, neglecting diode drops, and the signal applied to capacitor 744 has a voltage equal to the negative side of the telephone line offset in a positive direction by the magnitude of the transmit signal, again neglecting diode voltage drops. If the transmit signal is 0, the signal applied capacitor 744 has a voltage equal to the voltage of the negative side of the telephone line. Thus, the voltage across the telephone line is applied across capacitors 743 and 744. Since any received signal is present across the telephone line, the received signal will be applied to capacitors 743 and 744. The received signal is then filtered, sigma-delta modulated, and coupled across capacitor 724 to node 7111.

If a transmit signal is applied to node 7113, it is coupled through capacitor 725 to one bit D/A converter 711. One bit D/A converter 711 converts the sigma-delta bit stream input to an analog transmit signal, which is low-pass filtered by transmit low-pass filter 712. The low-pass filtered analog transmit signal is summed with the signal at node 7131 and passed through AC impedance filter 714 to transconductance driver 715. Transconductance driver 715 causes the transmit signal to be applied to the phone line.

Since transconductance driver 715 applies the transmit signal to the telephone line, both the transmit signal and the receive signal are present simultaneously on the telephone line. To properly receive the receive signal, it is necessary to separate the receive signal from the transmit signal. The function of separating the transmit signal from the receive signal is commonly referred to as the hybrid function.

To provide the hybrid function, the transmit signal is applied to node 793. Since the transmit signal is applied to the telephone line, and the telephone line is coupled through diodes 729 and 730 to node 777, the transmit signal is applied to both capacitor 743 and 744. Since the transmit signal is in phase at these two capacitors, the transmit signal is applied as a common mode signal, which is canceled out by the single ended to differential conversion network. Thus, the transmit signal is not applied to anti-alias and high pass filter 708. However, since the receive signal is present as a differential signal across the telephone line, and is applied in its differential form across nodes 777 and 793, the receive signal is produced as a differential output by the single-ended to differential conversion network. Thus, the receive signal is applied to anti-alias and high pass filter 708. Since only the receive signal, not the transmit signal, is applied to anti alias and high-pass filter 708, the hybrid function has been provided.

AC and DC line impedance matching is provided by an AC transconductance loop and DC transconductance loop. The AC transconductance loop comprises the single ended to differential conversion network, anti-alias and high-pass filter 708, summer 713, AC impedance filter 714 and transconductance driver 715. The AC transconductance loop may be adjusted to match the off-hook telephone line AC impedance standards. A DC transconductance loop comprises low pass filter and voltage/current (V/I) adjustment block 706, and transconductance control 707, along with external components such as NMOS FET 736. The DC transconductance loop may be adjusted to allow with compliance with off-hook telephone line DC impedance standards.

Solid state relays 763, 764, and 765 and resistors 766 and 767 allow current sensing and switching of the telephone line. Current sensing may be used to implement a parallel pick-up feature. The parallel pick-up feature may be used to disable a modem circuit when a telephone extension is picked up. Such a feature is useful if it is desired to place an emergency voice telephone call while modem communication is in progress on the telephone line. Loop current indicator and step detector 721 may be used to sense a change in voltage caused by a change in current through resistors 766 and 767. The changes detected by loop current indicator and step detector 721 are passed to LED driver 722, which communicates the information to optocoupler 727. Other status signals may be applied at inputs CC0 through CC4. These inputs are passed to LED driver 722, which communicates the information over optocoupler 727.

Command information may be communicated to the AFELIC 701 through optocoupler 726. Signals transmitted through optocoupler 726. Signals transmitted through optocoupler 726 are received by serial interface 717, which provides the signals to digital control block 718. Digital control block 718 uses the signals to control the operation of AFELIC 701 and associated circuitry.

Clock signals applied to node 7109 are passed through capacitor 723 and received by clock generation block 705. Clock generation block 705 provides clock signals to charge pump 704. Clock generation block 705 also provides timing information other portions of AFELIC 701. For example, clock generation block 705 provides timing information to circuits for communicating through capacitors 724 and 725.

Thus, a method and apparatus for providing a telephone hybrid function has been provided.

I claim:

1. A method for providing a telephone hybrid function comprising the steps of:

connecting a first input of a telephone hybrid function means for providing a telephone hybrid function to a first telephone line conductor;

connecting ground of said telephone hybrid function means to a second telephone line conductor, isolating ground of said telephone hybrid function means from earth ground;

receiving a telephone line signal at said first input of said telephone hybrid function means, said telephone line signal comprising a first transmit signal and a receive signal;

receiving a second transmit signal at a second input of said telephone hybrid function means;

highpass filtering said telephone line signal;

highpass filtering said second transmit signal;

converting said receive signal to a differential receive signal, using a converting means;

canceling said first and second transmit signals using a canceling means, to prevent said first and second transmit signals from being outputted;

outputting said differential receive signal, without outputting said first and second transmit signals.

2. The method of claim 1 further including the step of balancing said differential receive signal about a reference voltage.

3. The method of claim 1 wherein said step of highpass filtering said telephone line signal comprises the steps of:

passing a telephone line signal AC component from said first input to said converting means; and blocking a telephone line signal DC component from passing from said first input to said converting means.

4. The method of claim 3 wherein said step of highpass filtering said second transmit signal comprises the steps of:

passing a second transmit signal AC component from said second input to said converting means; and blocking a second transmit signal DC component from said second input to said converting means.

5. A hybrid circuit comprising:

a first input, a second input, and an output;

a first telephone line conductor coupled to said first input, said telephone line conductor carrying a first transmit signal and a receive signal;

a node coupled to said second input, said node carrying a second transmit signal;

a converting means for converting said receive signal to a differential receive signal, said converting means having a first input coupled to said first input of said hybrid circuit, said converting means having a second input coupled to said second input of said hybrid circuit, and said converting means having a differential output coupled to said output of said hybrid circuit;

a canceling means for canceling said first transmit signal and said second transmit signal, said canceling means having a first input coupled to said first input of said hybrid circuit, said canceling means having a second input coupled to said second input of said hybrid circuit, and said canceling means having a differential output coupled to said output of said hybrid circuit;

said output, of said hybrid circuit, providing said differential receive signal without providing said first and second transmit signals.

6. The hybrid circuit of claim 5 further comprising:

a second telephone line conductor, said second telephone line conductor being connected to ground of said hybrid circuit, isolating said hybrid circuit from earth ground.

7. The hybrid circuit of claim 6 wherein said differential receive signal is balanced about a reference voltage.

8. The hybrid circuit of claim 7 wherein said canceling means comprises:

an operational amplifier, said operational amplifier having a first operational amplifier input, a second operational amplifier input, a first operational amplifier output, and a second operational amplifier output;

a first resistor, said first resistor being connected between said first operational amplifier input, and said first operational amplifier output;

a second resistor, said second resistor being connected between said first operational amplifier input, and said second operational amplifier output;

said second operational amplifier input being connected to a reference voltage.

* * * * *